United States Patent [19]

Frost

[11] 4,417,649
[45] Nov. 29, 1983

[54] ARRANGEMENT FOR THE BRAKE SYSTEM OF A HYDROSTATIC LOADER INCLUDING A VALVE PORT BLOCK

[75] Inventor: Charles W. Frost, Lisbon, N. Dak.
[73] Assignee: Clark Equipment Company, Buchanan, Mich.
[21] Appl. No.: 251,438
[22] Filed: Apr. 6, 1981
[51] Int. Cl.³ ............................................. B60K 41/20
[52] U.S. Cl. .................................................. 192/3 R
[58] Field of Search ...................... 192/3 N, 3 R, 1, 2; 60/436; 91/41; 188/71.3, 71.1

[56] References Cited

U.S. PATENT DOCUMENTS

| | | | |
|---|---|---|---|
| 3,419,096 | 12/1968 | Zagotta | 180/6.48 |
| 3,420,059 | 1/1969 | Van Wagenen et al. | 60/53 |
| 3,545,579 | 12/1970 | Kostas | 192/3 N |
| 3,800,901 | 4/1974 | Blomstrom et al. | 180/9.62 |
| 4,201,279 | 5/1980 | Fukui | 192/3 N |

Primary Examiner—George H. Krizmanich
Attorney, Agent, or Firm—J. C. Wiessler; Kenneth C. Witt

[57] ABSTRACT

An improved arrangement for the brake system of a hydrostatic loader comprises a drive motor having an output shaft extending outwardly from both ends of the motor, drive means operatively connecting the output shaft to the axle of the loader at one end of the output shaft, the opposite end of the output shaft carrying a valve port block thereon, the valve port block mounted rigidly adjacent one end of the motor. A disc brake mechanism is then mounted on the output shaft adjacent the valve port block to complete the improved brake system arrangement.

6 Claims, 5 Drawing Figures

ARRANGEMENT FOR THE BRAKE SYSTEM OF A HYDROSTATIC LOADER INCLUDING A VALVE PORT BLOCK

CROSS REFERENCES

U.S. patent applications filed simultaneously herewith, one in the names of Thomas M. Sagaser et al entitled "Hydrostatic Control System for Articulate Loader", Ser. No. 251,440, filed Apr. 6, 1981, and the other in the name of Thomas M. Sagaser entitled "Pump Centering Control", Ser. No. 251,439, filed Apr. 6, 1981, both assigned to the Assignee of the present invention.

BACKGROUND OF THE INVENTION

1. Field of Use

This invention pertains to an improved design for a valve port block and in particular an improved arrangement for the brake system of a hydrostatic loader.

2. History of the Prior Art

A review of the prior art failed to produce a particular arrangement as disclosed by the present invention. For example, U.S. Pat. No. 3,420,059 entitled "Fluid Motor Transmission and Improvements Therein", Van Wagenen et al., discloses a hydraulic motor arrangement (FIG. 4) wherein the motor shaft 29 carrying a cam 82 extends through an area in which a plurality of valve blocks 69 are mounted. However, the valve blocks appear to be individual units rather than a single unit with an opening extending therethrough for passage of the motor shaft.

U.S. Pat. No. 3,419,096 entitled "Low Friction Hydrostatic Transaxle", Zagotta, discloses a hydrostatic transaxle including a plurality of motors 34 and 36 and a manifold plate 78 but the motor shaft does not extend through the manifold plate. The pump shaft 60 appears to drive a port plate but does not extend through a valve block as disclosed in the present invention.

U.S. Pat. No. 3,800,901 entitled "Final Drive Decoupling and Parking Brake Arrangement for Hydrostatic Loader", Blomstrom et al., discloses a hydrostatic drive which includes a parking or emergency brake to effect the locking of the input side of the reduction gearing as driven by a motor shaft but does not seem to include the components or manner of attachment of the present invention.

SUMMARY OF THE INVENTION

The present invention discloses a particular arrangement for the mounting of a brake disc on the hydrostatic drive motor of a hydrostatic front end loader type vehicle. The drive arrangement includes a hydrostatic motor wherein the output shaft extends completely through the motor on both ends whereby a disc brake mechanism is mounted on one end of the output shaft and the other end of the output shaft is provided with a gear that meshes with a gear on the axle pinion shaft.

Such an arrangement offers obvious advantages since there is a gear multiplication effect from the output motor to the wheels of the vehicle of approximately 12.125:1. Therefore, mounting the brakes on the wheels would result in the brake mechanism having to overcome an output force more than twelve times greater than if the brake disc were mounted on the output shaft of the motor. Thus, the disc brake arrangement in the present invention is more desirable than mounting disc brakes on the wheels.

Furthermore, the design configuration for the vehicle provides a valve port block coupled with the drive motor wherein the valve port block includes a high pressure forward release valve and a high pressure reverse relief valve in close proximity to the motor. Other port block functions include a shuttle check valve which is provided with appropriate piping to transfer low pressure oil from the motor through the valve port block to the reservoir for cooling. In addition, the valve port block contains a charge check valve which is directly coupled to a fluid port of the motor to maintain the pressure in the output lines going to the motor below a specified pressure level. Accordingly, the valve port block must be placed in close proximity to the motor and yet it is desirable to provide means whereby the brake disc can be mounted on one end of an output shaft passing through both ends of the motor.

Therefore, the present invention provides an improved arrangement for the brake system of a vehicle comprising a hydrostatic drive motor having an output shaft extending outwardly from opposite ends of the drive motor. A multi-purpose valve port block associated with the hydrostatic drive motor to control fluid flow configurations for the drive motor is mounted adjacent the drive motor on the motor output shaft, a disc brake mechanism is mounted on the output shaft adjacent the valve port block and vehicle drive means are mounted at the opposite end of the shaft.

Other advantages of the present structure may be obtained from a reading of the detailed description of the invention as set forth below particularly when a study of the drawings enclosed herewith accompany such reading.

DETAILED DESCRIPTION OF THE PREFERRED EMBODIMENT

Figure 1:
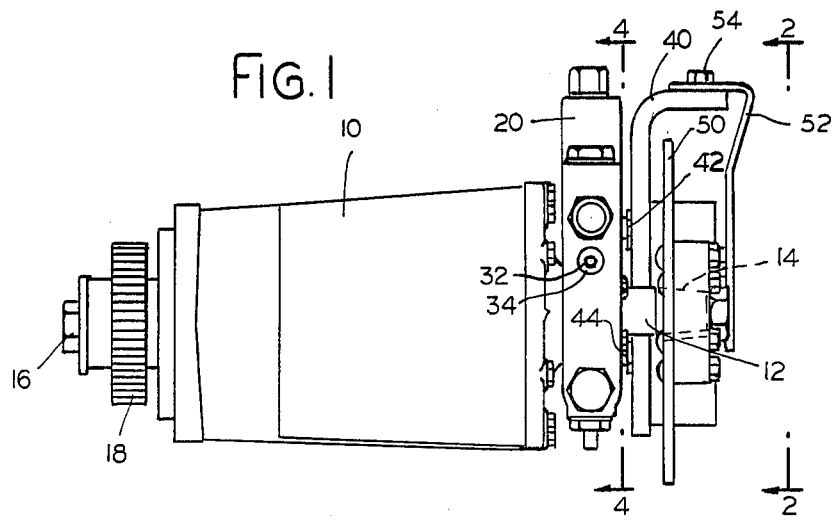
FIG. 1 is a side elevational view of the particular arrangement set forth in the present invention.
Figure 2:
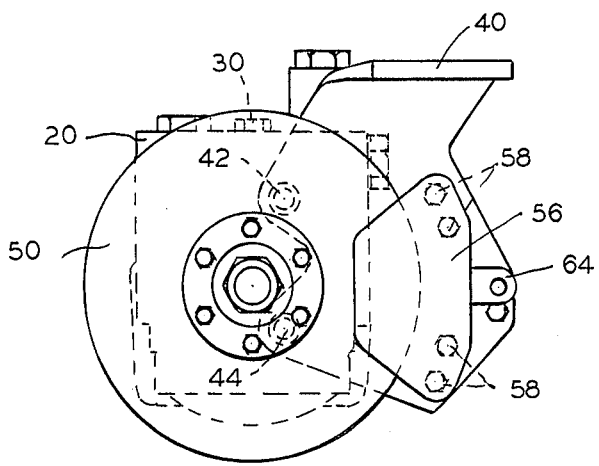
FIG. 2 is a sectional view taken along line 2—2 of FIG. 1.
Figure 3:
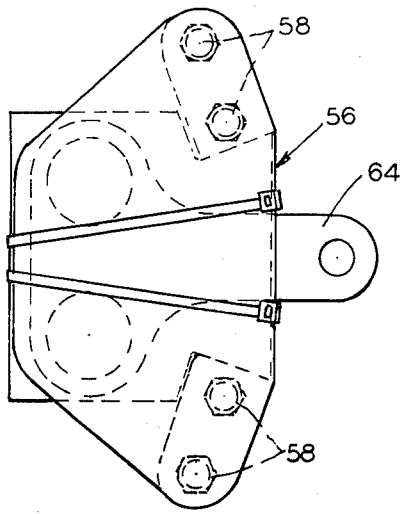
FIG. 3 is an enlarged detail view of the caliper brake of the present invention.

The braking arrangement of the present invention may also be seen in the drawings of co-pending patent application Ser. No. 251,440 entitled "Hydrostatic Control System for an Articulate Loader" filed concurrently with the present invention and assigned to the Assignee of the present invention. For example, the drawing of the latter named patent application shows the drive pumps which are operatively connected to the hydrostatic output motor 10 of FIG. 1.

The motor 10 has an output shaft 12 which protrudes from opposite ends of the motor 10, the shaft 12 having a forward end 14 and a rear end 16. The rear end 16 carries a pinion gear or drive means 18 mounted thereon that meshes with a gear or drive mechanism on the axle pinion shaft for rotation of the axle (not shown). A valve port block 20 having a central opening 20a is mounted on the forward end of the motor 10 surround the front end 14 of the motor output shaft 12. The port block is mounted on the shaft 12 adjacent the front end of the drive motor 10 and does not rotate therewith. As can be better seen in FIG. 4, a seal 22 adjacent the opening 20a protects the plumbing in the valve port block from the output shaft 12 and a snap ring 24 holds the seal 22 in place.

Figure 4:
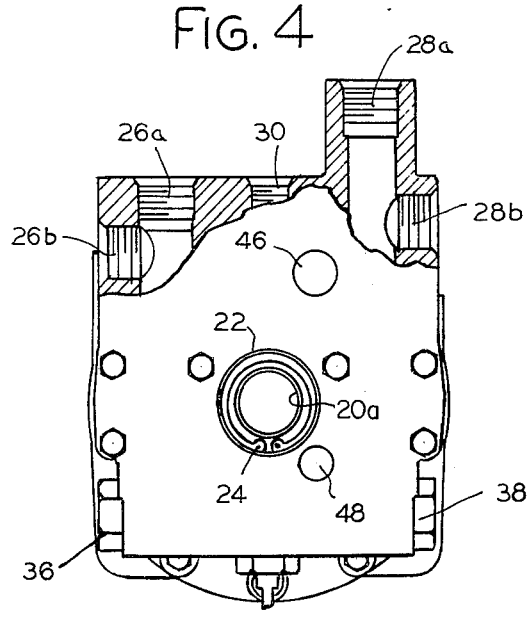
FIG. 4 is a sectional view taken along the line 4—4 of FIG. 1.
Figure 5:
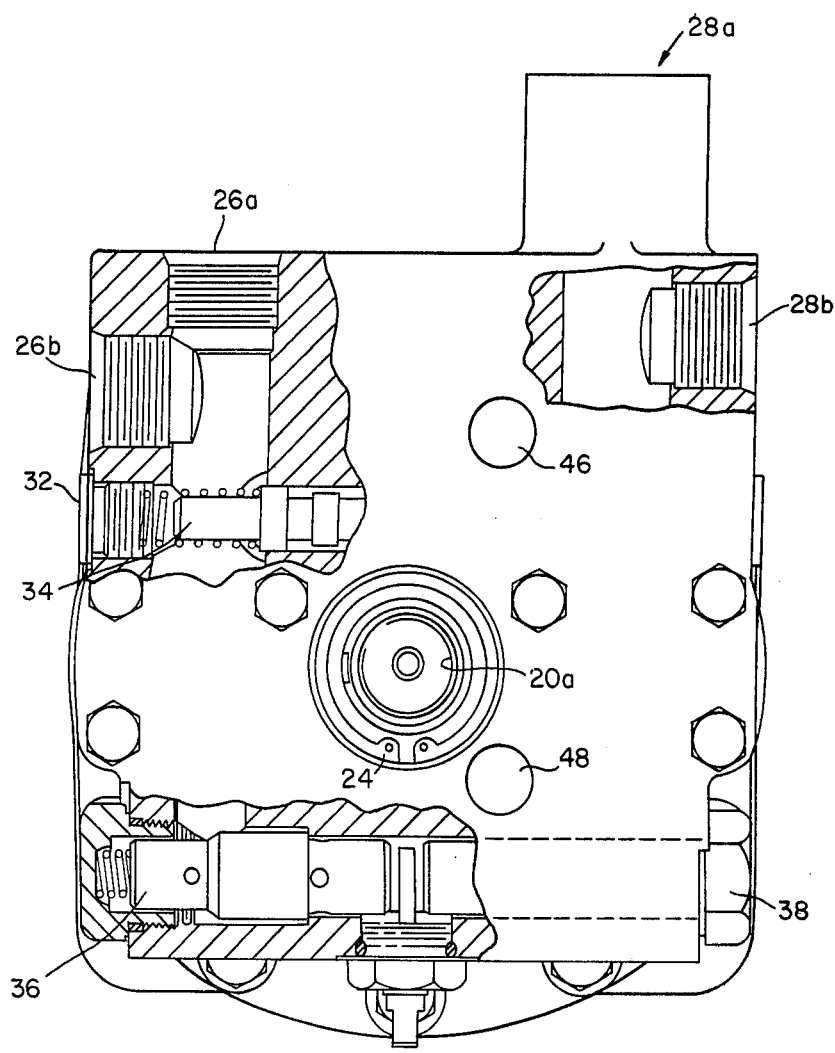
FIG. 5 is another view similar to FIG. 4 showing additional internal details.

Provided at the top of the valve port block 20 are high pressure inlet outlet ports 26a, 26b and 28a, 28b on opposite sides of the upper part of the port block 20. At upper center of the port block 20 is a case drain 30 wherein a charge check valve is mounted, such valve monitoring the charge pressure of the high pressure fluid flowing through the valve port block 20. High pressure relief valves 36,38 are provided on opposite sides of the port block 20 as seen in FIG. 4.

A shuttle valve 34 is mounted above the mid-portion of the valve port block 20 as defined by the heads 32 mounted at opposite ends of the valve port block 20. The shuttle valve 34 transfers low pressure oil through a loop interchange to a reservoir (not shown) for cooling. Mounted forward of the valve port block 20 is a brake mounting bracket 40 having pegs 42 and 44 rigidly mounted thereon as by welding. Pegs 42 and 44 are received in complementary openings 46 and 48 on the valve port block 20 to hold the brake mounting bracket 40 in place. Brake disc 50 is mounted forwardly of the brake mounting bracket 40. The brake disc 50 is keyed onto the shaft 12 for integral rotation therewith. A forward portion 52 of the bracket 40 is mounted on the mounting bracket 40 as by screw 54. A caliper 56 is mounted on the forward portion 52 as by bolts 58. The disc 50 rotates through opposite faces of the caliper 56 in a known fashion whereby an engaging mechanism or an actuating arm 64 of the caliper 56 is operatively connected through an appropriate linkage to a brake pedal (not shown) of the vehicle for operation in a known fashion.

The particular arrangement of the present invention sets forth a compact, efficient and economical manner of mounting a brake disc on a vehicle in cooperative relationship with the drive motor of the vehicle and the hydraulic components thereof. Mounting the brake disc directly on the output shaft of the motor greatly reduces the effort required to stop the output of the motor as compared with a typical brake system wherein the brakes are mounted on the wheels. Accordingly, the brake system of the present invention discloses an arrangement that offers substantial advantages over and is unique to the prior art.

The scope of the present invention may be ascertained by a careful consideration of the claims appended below:

I claim:

1. A brake system for a hydrostatic loader comprising an improved arrangement of components including:
   a hydrostatic drive motor having an output shaft extending from both ends of the motor;
   a multi-function valve port block fixedly mounted on one end of the motor, the output shaft of the motor passing therethrough;
   brake means mounted on the output shaft of the motor adjacent the valve port block; and
   drive means mounted on the end of the output shaft opposite the valve port block and the brake means, said drive means engageable with a drive mechanism.

2. The improvement as claimed in claim 1 wherein the the porting of the valve port block is so arranged as to provide a central opening therein for receiving the one end of the output shaft of the motor.

3. A brake system for a hydrostatic loader as claimed in claims 1 or 2 wherein the brake means includes a mounting bracket mounted on the valve port block adjacent the forward end thereof and a disc brake including a disc brake hub mounted on the output shaft of the motor adjacent the mounting bracket.

4. A brake system for a hydrostatic loader as claimed in claim 3 wherein the mounting bracket includes a forward extending portion whereupon a caliper is carried for engagement with the disc of the disc brake.

5. A brake system for a hydrostatic loader as claimed in claim 4 including an engaging mechanism provided on the disc brake mechanism cooperatively connectable to brake engaging means controlled by the operator of the vehicle.

6. The improvement as claimed in claim 2 wherein the valve port block includes inlet and outlet ports for the drive motor, a charge relief valve to maintain a fluid pressure through the motor at a specified level and a shuttle valve to transfer fluid from the motor to a reservoir for cooling.

* * * * *